(12) United States Patent
Cheng et al.

(10) Patent No.: US 10,016,722 B2
(45) Date of Patent: Jul. 10, 2018

(54) THERMAL POWER PLANT EXHAUST PURIFICATION DEVICE

(71) Applicants: Demist Tech. Inc, Arcadia, CA (US); Demister (Shanghai) Environmental Technology Co., Ltd., Shanghai (CN)

(72) Inventors: Zijian Cheng, Shanghai (CN); Guoku Weng, Arcadia, CA (US)

(73) Assignees: Demist Tech. Inc, Arcadia, CA (US); Demister (Shanghai) Environmental Technology Co., Ltd., Shanghai (CN)

( * ) Notice: Subject to any disclaimer, the term of this patent is extended or adjusted under 35 U.S.C. 154(b) by 0 days.

(21) Appl. No.: 15/526,249

(22) PCT Filed: Nov. 12, 2014

(86) PCT No.: PCT/CN2014/090942
§ 371 (c)(1),
(2) Date: May 11, 2017

(87) PCT Pub. No.: WO2016/074178
PCT Pub. Date: May 19, 2016

(65) Prior Publication Data
US 2017/0304770 A1    Oct. 26, 2017

(51) Int. Cl.
| B01D 53/34 | (2006.01) |
| B01D 53/74 | (2006.01) |
| B01D 46/00 | (2006.01) |
| F23J 15/00 | (2006.01) |
| B01D 46/02 | (2006.01) |
| F23J 15/06 | (2006.01) |

(52) U.S. Cl.
CPC .............. *B01D 53/74* (2013.01); *B01D 46/02* (2013.01); *B01D 53/34* (2013.01); *F23J 15/00* (2013.01); *F23J 15/06* (2013.01); *B01D 46/00* (2013.01); *F23J 2219/70* (2013.01)

(58) Field of Classification Search
CPC ........ B01D 53/34; B01D 46/00; B01D 46/02; B01D 53/74; B01D 53/002; F23J 2219/70; F23J 15/00; F23J 15/06; F23J 15/02; F23J 15/022; F01N 3/005; F01N 3/01; F01N 3/02; F01N 3/0205; F23D 7/10; F23D 9/0062
See application file for complete search history.

(56) References Cited

U.S. PATENT DOCUMENTS

| 3,363,681 A * | 1/1968 | Revilock ............... F28D 9/0062 165/166 |
| 4,903,756 A | 2/1990 | Monro |
| 5,122,352 A | 6/1992 | Johnson |
| 2012/0167461 A1 * | 7/2012 | Bentzen ................. B01D 47/00 48/61 |

FOREIGN PATENT DOCUMENTS

| CN | 101664717 A | 3/2010 | |
| CN | 201862325 U | 6/2011 | |
| CN | 102247708 A | 11/2011 | |
| CN | 103111371 A | 5/2013 | |
| CN | 103143444 A | 6/2013 | |
| CN | 203916446 U | 11/2014 | |
| CN | 204307496 U | 5/2015 | |
| DE | 29708011 U1 * | 8/1998 | ........... F01N 3/0205 |
| EP | 2154530 A2 | 2/2010 | |
| JP | H0349693 B2 * | 7/1991 | ........... B01D 53/002 |
| JP | H11147018 A | 6/1999 | |
| WO | 1989/012024 A | 12/1989 | |

OTHER PUBLICATIONS

International Search Report, International Patent Application No. PCT/CN2014/090942, dated Aug. 14, 2015, 3 pages.

* cited by examiner

*Primary Examiner* — Timothy C Vanoy
(74) *Attorney, Agent, or Firm* — Fitch Even Tabin & Flannery LLP

(57) ABSTRACT

A thermal power plant exhaust purification device, the device including a cooling substance flow channel and an exhaust flow channel; the device also includes a spacing member for spacing and exchanging heat between the cooling substance flow channel and the exhaust flow channel, the spacing member having an exhaust contact surface for collecting dust and/or mist contained in the exhaust; the cooling substance flows in the cooling substance flow channel, such that the condensate precipitated from hot exhaust uniformly adheres on the exhaust contact surface, thus forming a uniform and stable water film; on one hand, formation of the concentrated $H_2SO_4$ on a dust collecting plate is prevented, and a liquid film flows downwards under gravity, thereby cleaning the $H_2SO_4$ adhered on the dust collecting plate timely; on the other hand, the water film is very effective in intercepting droplets and capturing the dust.

51 Claims, 4 Drawing Sheets

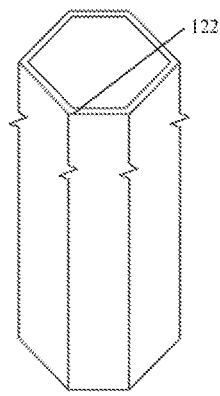 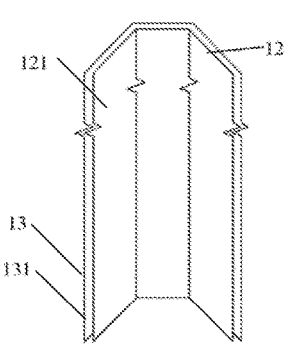 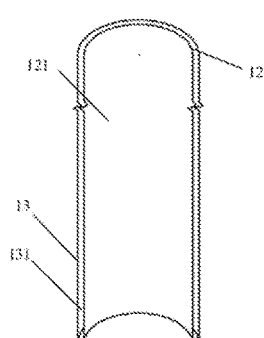 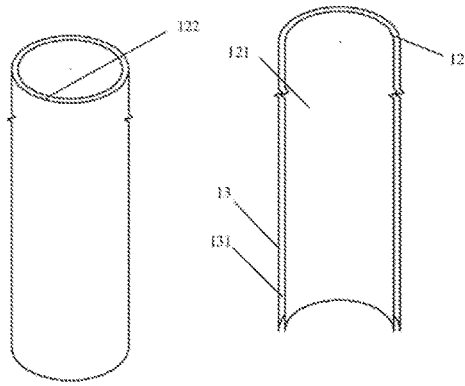
Fig. 13　　Fig. 14　　Fig. 15　　Fig. 16
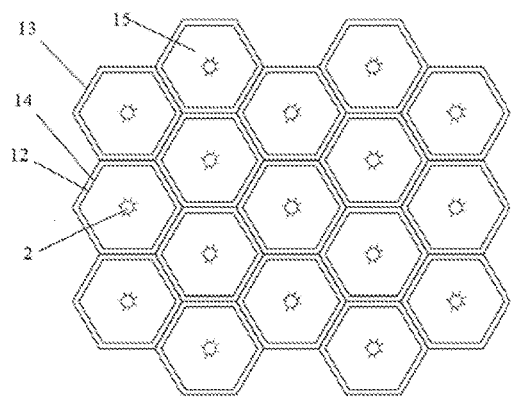 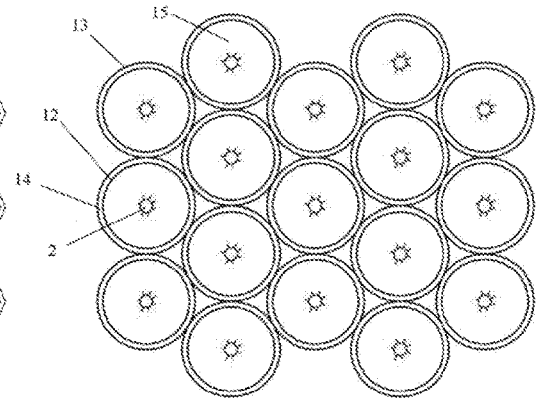
Fig. 17　　Fig. 18
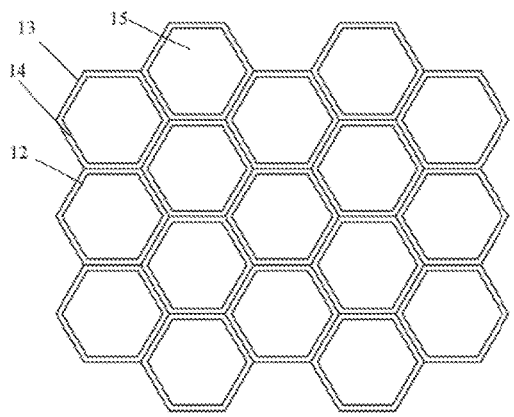 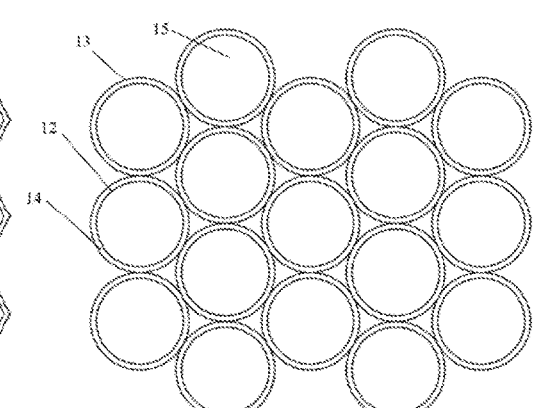
Fig. 19　　Fig. 20

THERMAL POWER PLANT EXHAUST PURIFICATION DEVICE

CROSS-REFERENCE TO RELATED APPLICATION

This application is a U.S. national phase application filed under 35 U.S.C. § 371 of International Application No. PCT/CN2014/090942, filed Nov. 12, 2014, designating the United States.

FIELD OF THE INVENTION

The present invention relates to the field of air purification, and in particular, to a thermal power plant exhaust purification device.

DESCRIPTION OF THE PRIOR ART

In the prior art, an effective thermal power plant exhaust purification device is generally a wet electrostatic precipitator, the dust collection process of which includes three processes of charging, collecting and cleaning dust and droplets. Therefore, correspondingly, a complete wet electrostatic precipitator includes a dust and droplets charging system, a collecting system and a cleaning system. A metal discharge wire in the wet electrostatic precipitator ionizes its ambient gas under a DC high voltage, such that the surface of a dust droplet particle is charged. Charged particles move toward a dust collection polar plate under an electric field force, and deposit thereon. Traditionally, in most cases, a spray water flow is adopted, which flows down from a top end of a dust collecting plate forming a water flow on the dust collecting plate and taking away dust particles on the dust collection polar plate.

The prior wet electrostatic precipitator may be categorized into two types. The first type has such a configuration that a flat metal polar plate is adopted as an anode plate (i.e., a dust collecting plate), anode plates are arranged in parallel with each other at intervals, a discharge stick is arranged between two anode plates, and an air flow horizontally flows in and out. Such a wet electrostatic precipitator has the following advantages: metal polar plates, high mechanical strength, good rigidity, difficult deformation, high temperature resistance, guaranteed electrode spacing, and stable electric field. With a relatively high running voltage, the dedusting effect may be ensured as long as the dedusting area is sufficient. Moreover, the high-efficiency dedusting effect may be realized by connecting a multistage electric field in series, i.e., a multistage design.

The second type has such a configuration that the anode plate is cellular or tubular, which should be referred to as a dust collecting tube more accurately; a dust collecting tube has various shapes such as cylindrical, square cylindrical and hexagon cylindrical. Flue gas enters at top and leaves at bottom or vise versa, and the flue gas flows along an inner cavity of an anode tube. The anode is made of conductive glass steel materials which can be conductive themselves due to the addition of conductive materials such as a carbon fiber felt and graphite powder therein. The anode adopts a needle cathode which is located at a center of each anode tube and adopts titanium alloy and super duplex stainless steel. A water-spraying dust cleaning system is arranged and needs to be rinsed once a day with power cut to clean the separated.

SUMMARY OF THE INVENTION

By practical application and comparison, the two types of wet electrostatic precipitators have the following disadvantages in that: 1. the water flow is not distributed uniformly during drip washing, so a uniform water film cannot be formed, which causes a dry-wet interface to be formed on the anode plate, and the dust collecting plate/collecting tube is short in service life; 2. there is only one electrostatic measurement for intercepting dust and droplets; 3. an gas flow rate allowed is relatively low, and is about 1~3 m/s, which further leads to a high space requirement of the existing precipitator, and does not contribute to technically updating and improving a built desulfurization system.

More particularly, the thermal power plant exhaust contains a large amount of $SO_2$. During the exhaust treatment, a part of $SO_2$ is oxidated to $SO_3$, and can be combined with water vapor in the exhaust to generate $H_2SO_4$. The formed $H_2SO_4$ adheres onto the dust collecting plate/collecting tube together with the dust and droplets in the exhaust. The traditional wet electrostatic precipitator adopts the drip washing manner to remove the dust and droplets on the dust collecting plate/collecting tube. Since a uniform and stable water film cannot be formed, the dry-wet interface would be formed on the dust collecting plate/collecting tube. Therefore, concentrated $H_2SO_4$ which may not be rinsed timely adheres on the dust collecting plate/collecting tube. In case of high voltage and a temperature of about 50° C., the dust collecting plate/collecting tube is much more likely to be corroded. In order to prolong the service life of the deduster, the collecting plate/collecting tube generally needs to use expensive materials high in corrosion resistance, which increases the cost of the exhaust purification device.

In order to solve the above problem, the present invention provides a thermal power plant exhaust purification device, comprising a cooling substance flow channel and an exhaust flow channel; the device further comprises a spacing member for spacing and exchanging heat between the cooling substance flow channel and the exhaust flow channel, the spacing member having an exhaust contact surface for collecting dust and/or mist contained in the exhaust.

In one embodiment, the number of the spacing member is a plurality, and the spacing members form a plurality of repeated spacing member groups. The spacing member group comprises a first spacing member and a second spacing member, the cooling substance flow channel is defined by the first spacing member and the second spacing member, and the exhaust flow channel is defined by two adjacent spacing member groups.

Further, the first spacing member and the second spacing member are integrated, or the spacing member group further comprises a connecting piece for connecting the first spacing member and the second spacing member.

Further, the first spacing member and the second spacing member are plate-like.

Further, the spacing member group is a hollow plate, the cooling substance flow channel is defined by a hollow structure of the hollow plate, and the exhaust flow channel is defined by the two adjacent hollow plates.

Further, the two adjacent hollow plates are oppositely charged, the distance between the two adjacent hollow plates is 50~300 mm; or an electrostatic generating device is further arranged between the two adjacent hollow plates, the hollow plate is positively charged, and the distance between the two adjacent hollow plates is 100~400 mm.

Further, the shape of the hollow plate is corrugate, preferably is sinusoidal.

Further, the hollow plate is provided with one or more hook portions thereon.

Further, the consumption and use ratio of the flow substance in the hollow plate are ignored, so the hollow plate shape may also be an integral circular tube or other tubes with an irregular cross section, such as a drop shape.

In another embodiment, the number of the spacing members is a plurality, the spacing member is tubular, and the exhaust flow channel is defined by an inner wall of the spacing member.

Further, the spacing member is sheathed with a second tubular member outside, and the cooling substance flow channel is defined by an outer wall of the spacing member and an inner wall of the second tubular member.

Further, the spacing member and the second tubular member are integrated.

Further, the device further comprises a connecting piece for connecting the spacing member and the second tubular member.

Further, the cross section of the spacing member is triangular, polygonal, circular or ellipse, and the cross section of the second tubular member is triangular, polygonal, circular or ellipse; preferably, the cross section of the spacing member is hexagonal, and the cross section of the second tubular member is hexagonal.

Further, the device further comprises an electrostatic generating device located in the spacing member, and the spacing member is positively charged.

Further, the cooling substance is a cooling liquid or cooling gas, wherein the cooling liquid is preferably water, more preferably industrial cooling water.

Further, the temperature of the cooling substance is 3-20° C.

The present invention further provides a thermal power plant exhaust purification system, comprising the above device.

Further, the system comprises one stage or multistage of one or more selected from a group consisting of a flat-plate demister, a rooftop demister, a tube demister and a horizontal airflow demister, arranged at an upstream position of the above device.

Further, the system further comprises a demisting device which is arranged at a downstream position of the thermal power plant exhaust purification device.

Further, the demisting device comprises a plurality of hollow plates, the hollow structure of which defines a heating substance flow channel, wherein the heating substance is hot water, whose temperature is ≥50° C.

Further, the present invention further provides a thermal power plant exhaust purification method, comprising the following steps:
providing an exhaust contact surface, such that the exhaust flows through the exhaust contact surface and the exhaust contact surface collects dust and/or mist contained in the exhaust;
cooling the exhaust contact surface to form a water film on the exhaust contact surface;
rinsing the dust and/or mist collected on the exhaust contact surface.

Further, the method further comprises:
providing flowing cooling substance;
providing spacing members to provide the exhaust contact surface, and spacing the cooling substance and the exhaust.

Further, the cooling substance is industrial cooling water.

The exhaust mentioned in the present invention refers to the one which is discharged from the thermal power plant and is processed by the traditional flat-plate demister, the rooftop demister, the tube demister or the horizontal airflow demister or their combinations.

The water film mentioned in the present invention refers to condensate which is formed by the heat exchange performed between hot exhaust and the cooling substance in the cooling substance flow channel and is adhered on the exhaust contact surface.

Compared with the prior art, the present invention has the following advantageous effects.

1. The cooling substance flows in the cooling substance flow channel, such that the condensate precipitated from the hot exhaust uniformly adheres on the exhaust contact surface, and thus forming a uniform and stable water film; on one hand, the formation of the concentrated $H_2SO_4$ on a dust collecting plate is prevented, and a liquid film flows downwards under gravity, thereby cleaning the $H_2SO_4$ adhered on the dust collecting plate timely; on the other hand, the water film is really effective in intercepting droplets and capturing the dust.

2. The electrostatic demisting and dedusting technology, the liquid film demisting and dedusting technology and the traditional corrugated plate curved channel demisting technology are dynamically integrated, which greatly increases the efficiency of intercepting and separating the dust and droplets.

3. The uniform and stable water film can effectively prevent the phenomenon of back corona.

4. The water-saving effect. Not only extra rinsing water is not necessary, but also the condensate is collected from the hot exhaust. The condensate has the effect of absorbing the dust and droplets, flows downwards under gravity to take away the intercepted dust, and prevents the blocking of the collecting plate. The condensate can be used for other uses after exiting the collecting plate and being processed, for example as the rinsing water of the demister in an absorption tower.

5. The hollow plate is corrugate, so the thermal power plant exhaust purification device is able to stand higher gas flow rate. Therefore, the thermal power plant exhaust purification device greatly reduces the volume, and decreases the space requirement of the device, which is crucial to updating the improved built desulfurization device.

6. The thermal power plant exhaust purification is provided with a demisting device at its downstream position. The demisting device is designed as a hollow structure within which the hot water flows. The demisting device has the effect of a heater, which increases the discharging temperature of the exhaust and effectively prevents the phenomenon of stack rain.

The technical conception, specific structure and the resultant technical effects of the present invention will be further illustrated below in conjunction with the accompanying drawings so as to make those skilled in the art fully understand the objective, features and effects of the present invention.

BRIEF DESCRIPTION OF THE DRAWINGS

FIG. 13 is a structure schematic view of the spacing member and the second tubular member according to another embodiment of the present invention, in which the cross sections of the spacing member and the second tubular member are regular-hexagonal.

FIG. 14 is a sectional view of the spacing member and the second tubular member in FIG. 13.

FIG. 15 is a structure schematic view of the spacing member and the second tubular member according to another embodiment of the present invention, in which the cross sections of the spacing member and the second tubular member are circular.

FIG. 16 is a sectional view of the spacing member and the second tubular member in FIG. 15.

FIG. 17 is a structural sectional view of the thermal power plant exhaust purification device according to another embodiment of the present invention, in which the electrostatic generating device is arranged in the spacing member as shown in FIG. 13.

FIG. 18 is a structural sectional view of the thermal power plant exhaust purification device according to another embodiment of the present invention, in which the electrostatic generating device is arranged in the spacing member as shown in FIG. 15.

FIG. 19 is a structural sectional view of the thermal power plant exhaust purification device according to another embodiment of the present invention, in which the electrostatic generating device is not arranged in the spacing member as shown in FIG. 13.

FIG. 20 is a structural sectional view of the thermal power plant exhaust purification device according to another embodiment of the present invention, in which the electrostatic generating device is not arranged in the spacing member as shown in FIG. 15.

DETAILED DESCRIPTION OF THE PREFERRED EMBODIMENTS

First Embodiment

Figure 1:
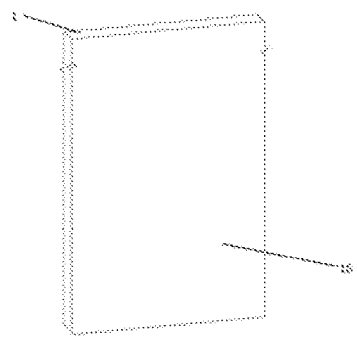
FIG. 1 is a structural schematic view of the hollow plate according to one embodiment of the present invention.
Figure 2:
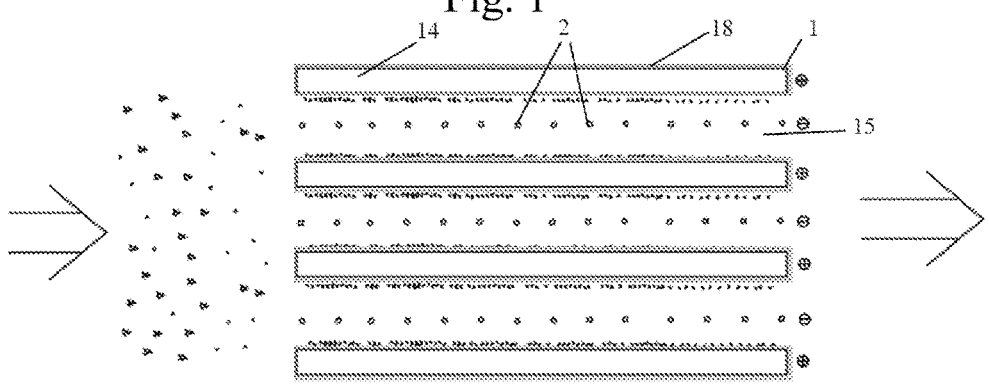
FIG. 2 is a structural sectional view of the thermal power plant exhaust purification device according to one embodiment of the present invention, in which the electrostatic generating device is located between the two adjacent hollow plates as shown in FIG. 1.

FIGS. 1-2 show one embodiment of the present invention. It can be seen from the drawings that the thermal power plant exhaust purification device mainly includes a hollow plate 1, a cooling substance flow channel 14 and an exhaust flow channel 15, and the hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 300 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the electrostatic generating device 2 is further arranged between the two adjacent hollow plates 1, and the hollow plate 1 is connected with the anode of the high voltage DC power supply.

When the thermal power plant exhaust purification device according to the present embodiment is operated, the exhaust which is at a temperature of 4555° C. and carries dust and droplets flows through the exhaust flow channel, the exhaust having a flow rate equal to or less than 5.0 m/s. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, the dust in the exhaust is captured when contacting the water film, and the droplet contacting the water film integrates with the water film instantaneously, captured by the water film; on the other hand, the electrostatic generating device 2 arranged in the exhaust flow channel ionizes the surrounding exhaust, and the suspending dust and droplets are charged to be converted into the charged dust and the charged droplets. Under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 5.0 m/s, and the powder content in the purified exhaust is equal to or less than 5 mg/Nm³.

Second Embodiment

Figure 3:
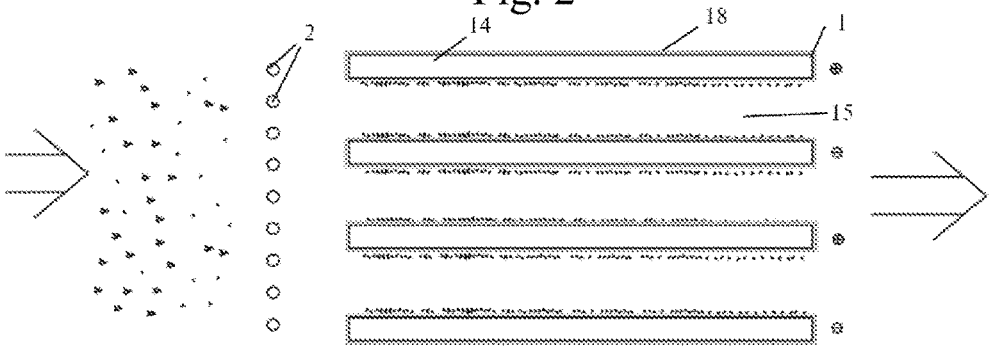
FIG. 3 is a structural sectional view of the thermal power plant exhaust purification device according to one embodiment of the present invention, in which the electrostatic generating device is located at the upstream position of the hollow plate as shown in FIG. 1.

FIG. 1 and FIG. 3 show another embodiment of the present invention. It can be seen from the drawings that the thermal power plant exhaust purification device mainly includes a hollow plate 1, a cooling substance flow channel 14 and an exhaust flow channel 15, in which the hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 300 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the thermal power plant exhaust purification device further includes an electrostatic generating device 2 arranged at an upstream position of the hollow plate 1. The electrostatic generating device 2 is used for charging the dust and droplets in the negatively charged exhaust before they enter the exhaust flow channel 15. The hollow plates 1 are connected with the anode of the high voltage DC power supply.

When the thermal power plant exhaust purification device according to the present embodiment is operated, the exhaust which is at a temperature of 45~55° C., has a flow rate less than or equal to 5.0 m/s, and carries dust and droplets passes through the electrostatic generating device 2. The dust and the droplets are negatively charged to be converted into the charged dust and charged droplets, and then flow through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, the dust in the exhaust is captured when contacting the water film, and the droplet contacting the water film integrates with the water film instantaneously, captured by the water film; on the other hand, under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 5.0 m/s, and the powder content in the purified exhaust is equal to or less than 5 mg/Nm³.

Third Embodiment

Figure 4:
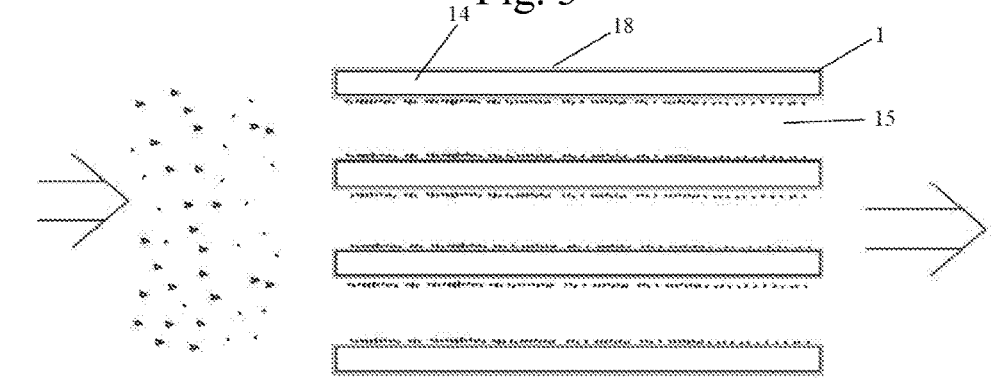
FIG. 4 is a structural sectional view of the thermal power plant exhaust purification device according to one embodiment of the present invention, in which the device is not provided with the electrostatic generating device.

FIG. 1 and FIG. 4 show another embodiment of the present invention. It can be seen from the drawings that the thermal power plant exhaust purification device mainly includes a hollow plate 1, a cooling substance flow channel 14 and an exhaust flow channel 15, in which the hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 40 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

When the thermal power plant exhaust purification device according to the present embodiment is operated, the exhaust which is at a temperature of 45~55V, has a flow rate less than or equal to 2.5 m/s, and carries dust and droplets flows through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. At this point, the dust in the exhaust is captured when contacting the water film, and the droplet contacting the water film integrates with the water film instantaneously, captured by the water film, therefore the dust and droplets in the exhaust are collected on the hollow plate 1.

In the present embodiment, the thermal power plant exhaust purification device realizes the exhaust flow rate of 2.5 m/s, and the powder content in the purified exhaust is equal to or less than 18 mg/Nm³.

Fourth Embodiment

Figure 5:
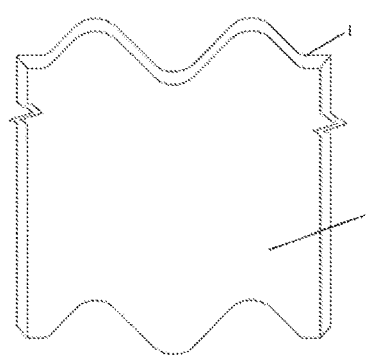
FIG. 5 is a structural schematic view of the hollow plate according to another embodiment of the present invention, in which the hollow plate has a shape of one and a half sine waves.
Figure 6:
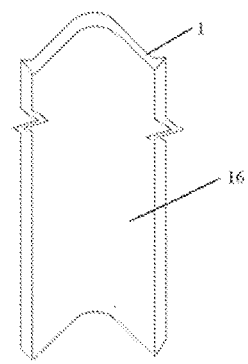
FIG. 6 is a structural schematic view of the hollow plate according to another embodiment of the present invention, in which the hollow plate has a shape of a half sine wave.
Figure 7:
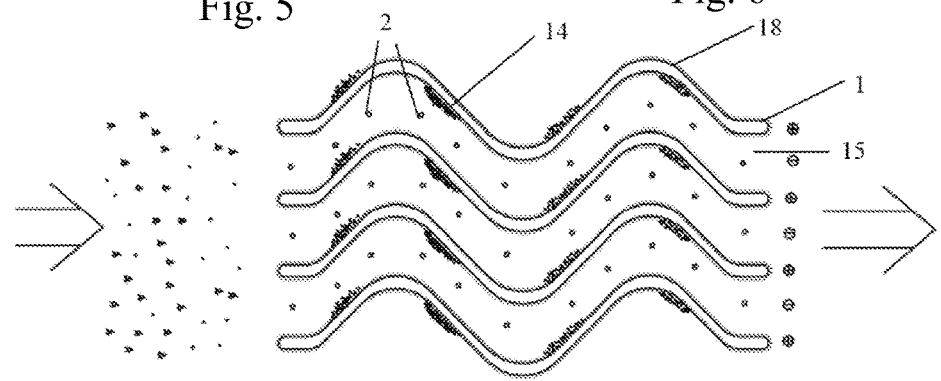
FIG. 7 is structural sectional view of the thermal power plant exhaust purification device according to another embodiment of the present invention, in which the electrostatic generating device is located between the two adjacent hollow plates as shown in FIG. 5.

FIGS. 5-7 show another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 55 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the electrostatic generating device 2 is further arranged between the two adjacent hollow plates 1. The hollow plates 1 are connected with the anode of the high voltage DC power supply.

When the thermal power plant exhaust purification device according to the present embodiment is operated, the exhaust which is at a temperature of 45~55° C. and carries dust and droplets flows through the exhaust flow channel, the exhaust having a flow rate equal to or less than 10.5 m/s. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, when the dust in the exhaust flows in the curved exhaust flow channel 15, the dust flies to the water film under a centrifugal force and is captured, and when the droplets in the exhaust flow in the curved exhaust flow channel 15, the droplets also fly to the water film under the centrifugal force; the droplets contacting with the water film are integrated with the water film instantaneously to be captured by the water film; on the other hand, the electrostatic generating device 2 arranged in the exhaust flow channel ionizes the surrounding exhaust, and the suspending dust and droplets are charged to be converted into the charged dust and the charged droplets. Under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 10.5 m/s, and the powder content in the purified exhaust is equal to or less than 5 mg/Nm$^3$.

Fifth Embodiment

Figure 8:
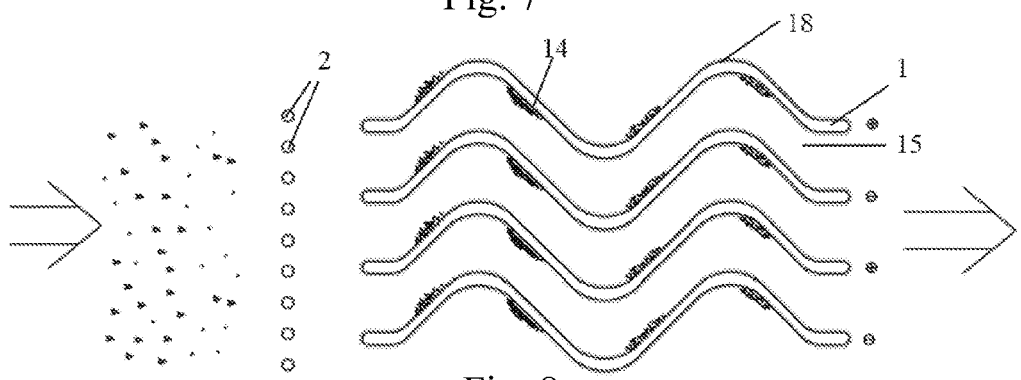
FIG. 8 is structural sectional view of the thermal power plant exhaust purification device according to one embodiment of the present invention, in which the electrostatic generating device is located at an upstream position of the hollow plate as shown in FIG. 5.

FIGS. 5, 6 and 8 show another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 40 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the thermal power plant exhaust purification device further includes an electrostatic generating device 2 arranged at an upstream position of the hollow plate 1. The electrostatic generating device 2 is used for charging the dust and droplets in the negatively charged exhaust before they enter the exhaust flow channel 15. The hollow plates 1 are connected with the anode of the high voltage DC power supply.

When the thermal power plant exhaust purification device according to the present embodiment is operated, the exhaust which is at a temperature of 45~55° C., has a flow rate less than or equal to 11.0 m/s, and carries dust and droplets passes through the electrostatic generating device 2. The dust and the droplets are negatively charged to be converted into the charged dust and charged droplets, and then flow through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, when the dust in the exhaust flows in the curved exhaust flow channel 15, the dust flies to the water film under a centrifugal force and is captured, and when the droplets in the exhaust flow in the curved exhaust flow channel 15, the droplets also fly to the water film under the centrifugal force; the droplets contacting with the water film are integrated with the water film instantaneously to be captured by the water film; on the other hand, under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 11.0 m/s, and the powder content in the purified exhaust is equal to or less than 5 mg/Nm$^3$.

Sixth Embodiment

Figure 9:
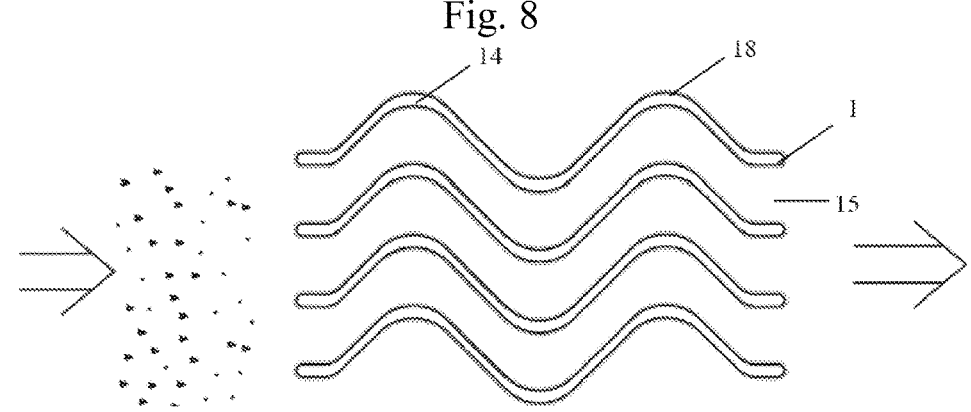
FIG. 9 is a structural sectional view of the thermal power plant exhaust purification device according to another embodiment of the present invention, in which the device is not provided with the electrostatic generating device.

FIGS. 5, 6 and 9 show another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust.

In the present embodiment, the thermal power plant exhaust purification device is provided with a plurality of hollow plates 1 which are arranged in parallel at intervals. The distance between the two adjacent hollow plates 1 is about 30 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

When the thermal power plant exhaust purification device according to the present embodiment is operated, the exhaust which is at a temperature of 45~55° C., has a flow rate less than or equal to 8.5 m/s, and carries dust and droplets passes through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. At this point, when the dust in the exhaust flows in the curved exhaust flow channel 15, the dust flies to the water film under a centrifugal force, and is captured; when the droplets in the exhaust flow in the curved exhaust flow channel 15, the droplets also fly to the water film under the centrifugal force. The droplets contacting with the water film are integrated with the water film instantaneously to be captured by the water film, therefore the dust and droplets in the exhaust are collected on the hollow plate 1.

In the present embodiment, the thermal power plant exhaust purification device realizes the exhaust flow rate of 8.5 m/s, and the powder content in the purified exhaust is equal to or less than 9 mg/Nm$^3$.

Seventh Embodiment

Figure 10:
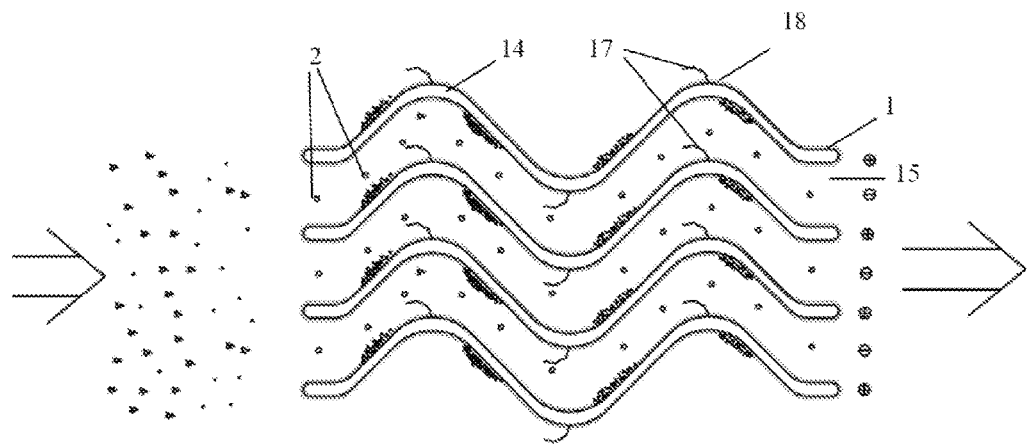
FIG. 10 is structural sectional view of the thermal power plant exhaust purification device according to another embodiment of the present invention, in which the electrostatic generating device is located at an upstream position of the hollow plate, and the hollow plate is provided with a hook portion thereon.

FIG. 10 shows another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust. As shown in FIG. 10, the hollow plate 1 further includes one or more hook portions 17 thereon.

In the present embodiment, the thermal power plant exhaust purification device is provided with a plurality of hollow plates 1 which are arranged in parallel at intervals. The distance between the two adjacent hollow plates 1 is about 30 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the electrostatic generating device 2 is further arranged between the two adjacent hollow plates 1. The hollow plates 1 are connected with the anode of the high voltage DC power supply.

When the thermal power plant exhaust purification device according to the present embodiment is operated, the exhaust which is at a temperature of 45~55° C. and carries dust and droplets flows through the exhaust flow channel, the exhaust having a flow rate equal to or less than 12.0 m/s. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, when the dust in the exhaust flows in the curved exhaust flow channel 15, the dust increases in the flow rate after passing through a narrow channel defined by the hook portion 17 and the hollow plate, flies to the water film under a relatively large centrifugal force, and is captured, and when the droplets in the exhaust flow in the curved exhaust flow channel 15, the droplets increase in the flow rate after passing through a narrow channel defined by the hook portion 17 and the hollow plate, and also fly to the water film under the centrifugal force; the droplets contacting with the water film are integrated with the water film instantaneously to be captured by the water film. On the other hand, the electrostatic generating device 2 arranged in the exhaust flow channel ionizes the surrounding exhaust, and the suspending dust and droplets are charged to be converted into the charged dust and the charged droplets. Under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 12.0 m/s, and the powder content in the purified exhaust is equal to or less than 4 mg/Nm$^3$.

Eighth Embodiment

Figure 11:
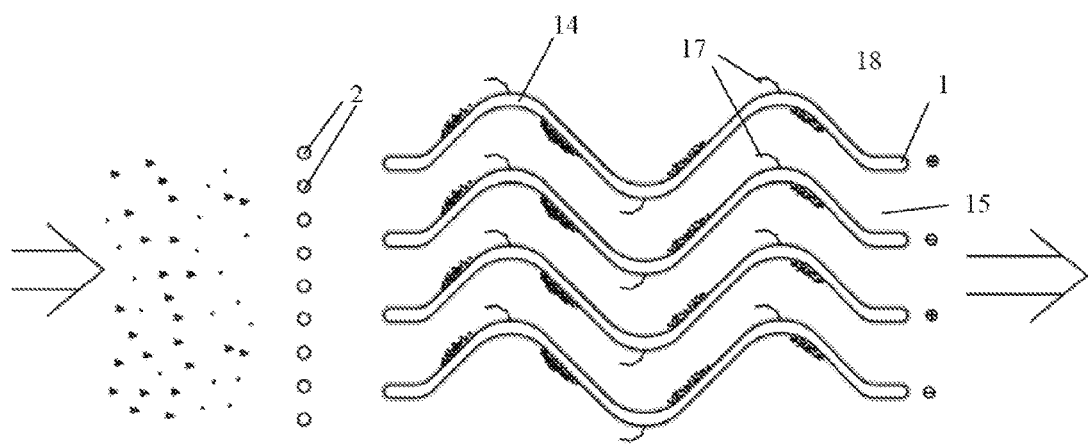
FIG. 11 is structural sectional view of the thermal power plant exhaust purification device according to one embodiment of the present invention, in which the electrostatic generating device is located at an upstream position of the hollow plate, and the hollow plate is provided with a hook portion thereon.

FIG. 11 shows another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust. As shown in FIG. 11, the hollow plate 1 further includes one or more hook portions 17 thereon.

In the present embodiment, the thermal power plant exhaust purification device is provided with a plurality of hollow plates 1 which are arranged in parallel at intervals. The distance between the two adjacent hollow plates 1 is about 30 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

In addition, the thermal power plant exhaust purification device further includes an electrostatic generating device 2 arranged at an upstream position of the hollow plate 1. The electrostatic generating device 2 is used for charging the dust and droplets in the negatively charged exhaust before they enter the exhaust flow channel 15. The hollow plates 1 are connected with the anode of the high voltage DC power supply.

When the thermal power plant exhaust purification device according to the present embodiment is operated, the exhaust which is at a temperature of 45~55° C., has a flow rate less than or equal to 12.0 m/s, and carries dust and droplets passes through the electrostatic generating device 2. The dust and the droplets are negatively charged to be converted into the charged dust and charged droplets, and then flow through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, forming a layer of thin, uniform and stable water film 18. In this case, on the one hand, when the dust in the exhaust flows in the curved exhaust flow channel 15, the dust increases in the flow rate after passing through a narrow channel defined by the hook portion 17 and the hollow plate, flies to the water film under a relatively large centrifugal force, and is captured. When the droplets in the exhaust flow in the curved exhaust flow channel 15, the droplets increase in the flow rate after passing through a narrow channel defined by the hook portion 17 and the hollow plate, and also fly to the water film under the centrifugal force. The droplets contacting with the water film are integrated with the water film instantaneously to be captured by the water film. On the other hand, under the electric field, the charged dust and the charged droplets move to the anode plate, that is in the direction of the hollow plate 1, thereby being collected on the hollow plate 1.

In the present embodiment, the thermal power plant exhaust purification device realizes the exhaust flow rate of 12.0 m/s, and the powder content in the purified exhaust is equal to or less than 4 mg/Nm³.

Ninth Embodiment

Figure 12:
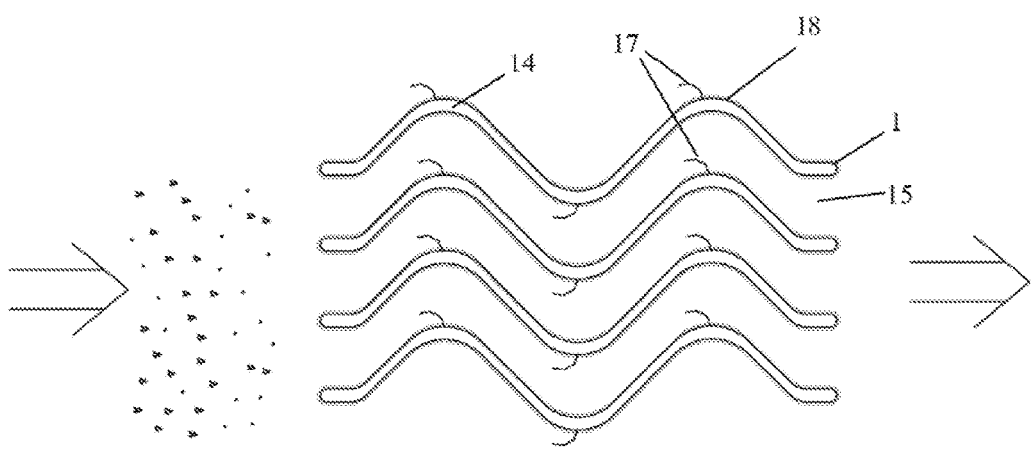
FIG. 12 is structural sectional view of the thermal power plant exhaust purification device according to another embodiment of the present invention, in which the device is not provided with the electrostatic generating device, and the hollow plate is provided with a hook portion thereon.

FIG. 12 shows another embodiment of the present invention. It can be seen from the drawings that the thermal power plant exhaust purification device mainly includes a hollow plate 1, a cooling substance flow channel 14 and an exhaust flow channel 15. The shape of the hollow plate 1 is corrugate, preferably is sinusoidal. More specifically, the hollow plate 1 has a half sine wave (as shown in FIG. 6) or more than a half sine wave, for example, one and a half sine waves (as shown in FIG. 5). The hollow plate 1 has an exhaust contact surface 16 for collecting dust and/or mist contained in the exhaust. As shown in FIG. 12, the hollow plate 1 further includes one or more hook portions 17 thereon.

In the present embodiment, the thermal power plant exhaust purification device is provided with a plurality of hollow plates 1 which are arranged in parallel at intervals. The distance between the two adjacent hollow plates 1 is about 30 mm. The cooling substance flow channel 14 is defined by the hollow structure of the hollow plate 1, and the exhaust flow channel 15 is defined by the two adjacent hollow plates 1; a cooling substance flow inlet is communicated with a water supply system, and a cooling substance flow outlet is communicated with a water discharge system; the cooling substance flow inlet and the flow outlet can be arranged on the hollow plate 1 as appropriate, without limiting the specific position.

When the thermal power plant exhaust purification device according to the present embodiment is operated, the exhaust which is at a temperature of 45~55° C., has a flow rate less than or equal to 8.5 m/s, and carries dust and droplets passes through the exhaust flow channel. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the exhaust contact surface 16, =forming a layer of thin, uniform and stable water film 18. At this point, when the dust in the exhaust flows in the curved exhaust flow channel 15, the dust increases in the flow rate after passing through a narrow channel defined by the hook portion 17 and the hollow plate, flies to the water film under a relatively large centrifugal force, and is captured. When the droplets in the exhaust flow in the curved exhaust flow channel 15, the droplets increase in the flow rate after passing through a narrow channel defined by the hook portion 17 and the hollow plate, and also fly to the water film under the centrifugal force. The droplets contacting with the water film are integrated with the water film instantaneously to be captured by the water film. Therefore, the dust and droplets in the exhaust are collected on the hollow plate 1.

In the present embodiment, the thermal power plant exhaust purification device realizes the exhaust flow rate of 8.5 m/s, and the powder content in the purified exhaust is equal to or less than 8 mg/Nm³.

Tenth Embodiment

FIGS. 13-18 are another embodiment of the present invention. In order to show the specific structure of the present invention more clearly, FIGS. 17 and 18 are sectional views of the thermal power plant exhaust purification device practically. The device according to the present embodiment includes a cooling substance flow channel 14 and an exhaust flow channel 15; the device further includes a spacing member 12 for spacing and exchanging heat between the cooling substance flow channel 14 and the exhaust flow channel 15, the spacing member 12 having an exhaust contact surface for collecting dust and/or mist contained in the exhaust.

In the present embodiment, the thermal power plant exhaust purification device has a plurality of spacing members 12 which are tubular. As shown in FIGS. 13-16, the spacing member 12 has an inner wall 121 and an outer wall 122 corresponding to the inner wall. The exhaust flow channel is defined by the inner wall 121 of the spacing member. That is, the inner wall 121 of the spacing member is the exhaust contact surface for collecting the dust and/or mist in the exhaust in practice.

In addition, the spacing member 12 is sheathed with a second tubular member 13 outside. The cooling substance flow channel is defined by the outer wall 122 of the spacing member and the inner wall 131 of the second tubular member 13.

One spacing member 12 and one second tubular member 13 constitute one collecting component, that is, a repeating unit of the thermal power plant exhaust purification device according to the present embodiment. The thermal power plant exhaust purification device includes a plurality of such collecting components which form a honeycomb shape. The spacing member 12 and the second tubular member 13 are integrated or are connected through a connecting piece. The cooling substance flow inlet and the flow outlet can be arranged on the second tubular member 13 and/or the connecting piece as appropriate, without limiting the specific position.

The cross section of the spacing member 12 may be triangular, polygonal, circular (as shown in FIGS. 15, 16 and 18) or ellipse, and the cross section of the second tubular member 13 is triangular, polygonal, circular (as shown in FIGS. 15, 16 and 18) or ellipse. Preferably, the cross section of the spacing member 12 is hexagonal, and the cross section of the second tubular member 13 is hexagonal, as shown in FIGS. 13, 14 and 17.

In addition, the electrostatic generating device 2 is further arranged in the spacing member 12, and the electrostatic generating device 2 is connected with the anode of the high voltage DC power supply.

When the thermal power plant exhaust purification device according to the present embodiment is operated, the exhaust which is at a temperature of 45~55° C. and carries dust and droplets flows through the exhaust flow channel, the exhaust having a flow rate equal to or less than 4.5 m/s. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the inner wall 121 of the spacing member 12, forming a layer of thin, uniform and stable water film. In this case, on the one hand, the dust in the exhaust is captured when contacting the water film, and the droplet contacting the water film integrates with the water film instantaneously, captured by the water film; on the other hand, the electrostatic generating device 2 arranged in the spacing member 12 ionizes the surrounding exhaust, and the suspending dust and droplets are charged to be converted into the charged dust and the charged droplets. Under the electric field, the charged dust and the charged droplets move to the positively charged spacing member 12, thereby being collected on the inner wall 121 of the spacing member 12.

In the present embodiment, the thermal power plant exhaust purification device realizes the exhaust flow rate of 4.5 m/s, and the powder content in the purified exhaust is equal to or less than 6 mg/Nm$^3$.

Eleventh Embodiment

FIGS. 13-16 and 19-20 are another embodiment of the present invention. In order to show the specific structure of the present invention more clearly, FIGS. 19 and 20 are sectional views of the thermal power plant exhaust purification device practically. The device according to the present embodiment includes a cooling substance flow channel 14 and an exhaust flow channel 15; the device further includes a spacing member 12 for spacing and exchanging heat between the cooling substance flow channel 14 and the exhaust flow channel 15, the spacing member 12 having an exhaust contact surface for collecting dust and/or mist contained in the exhaust.

In the present embodiment, the thermal power plant exhaust purification device has a plurality of spacing members 12 which are tubular. As shown in FIGS. 13-16, the spacing member 12 has an inner wall 121 and an outer wall 122 corresponding to the inner wall. The exhaust flow channel is defined by the inner wall 121 of the spacing member. That is, the inner wall 121 of the spacing member is the exhaust contact surface for collecting the dust and/or mist in the exhaust in practice.

In addition, the spacing member 12 is sheathed with a second tubular member 13 outside. The cooling substance flow channel is defined by the outer wall 122 of the spacing member and the inner wall 131 of the second tubular member 13.

One spacing member 12 and one second tubular member 13 constitute one collecting component, that is, a repeating unit of the thermal power plant exhaust purification device according to the present embodiment. The thermal power plant exhaust purification device includes a plurality of such collecting components which form a honeycomb shape. The spacing member 12 and the second tubular member 13 are integrated or are connected through a connecting piece. The cooling substance flow inlet and the flow outlet can be arranged on the second tubular member 13 and/or the connecting piece as appropriate, without limiting the specific position.

The cross section of the spacing member 12 may be triangular, polygonal, circular or ellipse, and the cross section of the second tubular member 13 is triangular, polygonal, circular (as shown in FIGS. 15, 16 and 20) or ellipse. Preferably, the cross section of the spacing member 12 is hexagonal, and the cross section of the second tubular member 13 is hexagonal, as shown in FIGS. 13, 14 and 19.

When the thermal power plant exhaust purification device according to the present embodiment is operated, the exhaust which is at a temperature of 45~55° C. and carries dust and droplets flows through the exhaust flow channel, the exhaust having a flow rate equal to or less than 2.5 m/s. The cooling substance flows in the cooling substance flow channel, the cooling substance being cooling liquid or cooling gas, preferably industrial cooling water. The temperature of the cooling substance is 3-20° C. Since the temperature of the cooling substance is lower than the temperature of exhaust, and the exhaust is almost saturated wet flue gas, the exhaust condensates on the inner wall 121 of the spacing member 12, forming a layer of thin, uniform and stable water film. At this point, the dust in the exhaust is captured when contacting the water film, and the droplet contacting the water film integrates with the water film instantaneously, captured by the water film. Therefore, the dust and droplets in the exhaust are collected on the inner wall 121 of the spacing member 12.

In the present embodiment, the thermal power plant exhaust purification device realizes the exhaust flow rate of 2.5 m/s, and the powder content in the purified exhaust is equal to or less than 20 mg/Nm$^3$.

After the exhaust carrying the dust and droplets is processed by the thermal power plant exhaust purification device according to the present invention, the saturated wet flue gas is obtained, that is, the relative humidity reaches or is near 100%. The gas flow will precipitate condensate due to the loss of heat in a downstream apparatus of the thermal power plant exhaust purification device according to the present invention, such as a flue or chimney at a downstream position. Since the temperature of the exhaust processed by the thermal power plant exhaust purification device according to the present invention is lower than an acid dew point temperature, a small amount of corrosive gas will corrode the downstream apparatus. Therefore, a demisting device is preferably arranged at the downstream of the thermal power plant exhaust purification device according to the present invention. The demisting device includes a plurality of hollow plates 1, the hollow structure of which defines a heating substance flow channel. Hot water at a temperature of higher than 50° C. flows in the hollow plate. After the saturated wet flue gas is heated by the demister, the flue gas temperature is increased while the droplets are intercepted and collected, thereby eliminating or alleviating the stack rain and "white smoke". In order to idealize the above effects, the hollow plate 1 preferably includes one or more hook portions 17.

In order to ensure that the thermal power plant exhaust purification device according to the present invention is operated safely, reliably and in a long term, preferably, a rinsing system is configured at the upstream side and/or downstream side of the thermal power plant exhaust purification device according to the present invention and the demisting device at its downstream position. When an operation voltage drop of the thermal power plant exhaust purification device according to the present invention and the demisting device at its downstream position is raised, the rinsing system may be started to remove the clogged scale sub stance.

Additionally, in use, the thermal power plant exhaust purification device according to the present invention may be further provided with one stage or multistage of one or more selected from a group consisting of a flat-plate demister, a rooftop demister, a tube demister and a horizontal airflow demister at its upstream position, so as to optimize the dedusting effect.

The preferred specific embodiment of the invention has been described in detail above. It is to be understood that numerous modifications and variations can be made by those ordinary skilled in the art in accordance with the concepts of the present invention without any inventive effort. For example, the thermal power plant exhaust purification device according to the present invention is applied to an inclined flue or a vertical flue or an absorption tower, or the thermal power plant exhaust purification device according to the present invention and/or the demisting device is designed to have more than one stage, or the form of the hollow plate of the present invention is replaced with a baffle plate form, or other curve forms. Or, a hook portion or a hole is additionally arranged on the collecting plate, or the spacing between the collecting plates is changed, and the like. Therefore, the technical solutions that may be derived by those skilled in the art according to the concepts of the present invention on the basis of the prior art through logical analysis, reasoning and limited experiments should be within the scope of protection defined by the claims.

The invention claimed is:

1. A thermal power plant exhaust purification device, wherein the device comprise a cooling substance flow channel and an exhaust flow channel; the device further comprises a spacing member for spacing and exchanging heat between the cooling substance flow channel and the exhaust flow channel, the spacing member having an exhaust contact surface for collecting dust and/or mist contained in the exhaust.

2. The device according to claim 1, wherein the number of the spacing member is a plurality, and the spacing members form multiple repeated spacing member groups; the spacing member group comprises a first spacing member and a second spacing member, the cooling substance flow channel is defined by the first spacing member and the second spacing member, and the exhaust flow channel is defined by two adjacent spacing member groups.

3. The device according to claim 2, wherein the first spacing member and the second spacing member are integrated.

4. The device according to claim 2, wherein the spacing member group further comprises a connecting piece for connecting the first spacing member and the second spacing member.

5. The device according to claim 2, wherein the first spacing member and the second spacing member are plate-like.

6. The device according to claim 2, wherein the spacing member group is a hollow plate, the cooling substance flow channel is defined by a hollow structure of the hollow plate, and the exhaust flow channel is defined by the two adjacent hollow plates.

7. The device according to claim 6, wherein the two adjacent hollow plates are oppositely charged.

8. The device according to claim 7, wherein the distance between the two adjacent hollow plates is 100~400 mm.

9. The device according to claim 6, wherein an electrostatic generating device is further arranged between the two adjacent hollow plates, and the hollow plate is positively charged.

10. The device according to claim 9, wherein the distance between the two adjacent hollow plates is 50~300 mm.

11. The device according to claim 6, wherein the shape of the hollow plate is corrugate.

12. The device according to claim 11, wherein the shape of the hollow plate is sinusoidal.

13. The device according to claim 11, wherein the hollow plate is provided with one or more hook portions thereon.

14. The device according to claim 1, wherein the number of the spacing members is a plurality, the spacing member is tubular, and the exhaust flow channel is defined by an inner wall of the spacing member.

15. The device according to claim 14, wherein the spacing member is sheathed with a second tubular member outside, and the cooling substance flow channel is defined by an outer wall of the spacing member and an inner wall of the second tubular member.

16. The device according to claim 15, wherein the spacing member and the second tubular member are integrated.

17. The device according to claim 15, wherein the device further comprises a connecting piece for connecting the spacing member and the second tubular member.

18. The device according to claim 15, wherein the cross section of the spacing member is triangular, polygonal, circular or ellipse, and the cross section of the second tubular member is triangular, polygonal, circular or ellipse.

19. The device according to claim 18, wherein and the cross section of the spacing member is hexagonal, and the cross section of the second tubular member is hexagonal.

20. The device according to claim 14, wherein the device further comprises an electrostatic generating device located in the spacing member, and the spacing member is positively charged.

21. The device according to claim 1, wherein the cooling substance is a cooling liquid or cooling gas.

22. The device according to claim 21, wherein the cooling liquid is water.

23. The device according to claim 21, wherein the cooling liquid is industrial cooling water.

24. The device for removing dust and mist according to claim 1, wherein the temperature of the cooling substance is 3-20° C.

25. A thermal power plant exhaust purification system, wherein the system comprises a thermal power plant exhaust purification device, the device comprising:
a cooling substance flow channel;
an exhaust flow channel; and
a spacing member for spacing and exchanging heat between the cooling substance flow channel and the exhaust flow channel, the spacing member having an exhaust contact surface for collecting dust and/or mist contained in the exhaust.

26. The system according to claim 25, wherein the number of the spacing member is a plurality, and the spacing members form multiple repeated spacing member groups; the spacing member group comprises a first spacing member and a second spacing member, the cooling substance flow channel is defined by the first spacing member and the second spacing member, and the exhaust flow channel is defined by two adjacent spacing member groups.

27. The system according to claim 26, wherein the first spacing member and the second spacing member are integrated.

28. The system according to claim 26, wherein the spacing member group further comprises a connecting piece for connecting the first spacing member and the second spacing member.

29. The system according to claim 26, wherein the first spacing member and the second spacing member are plate-like.

30. The system according to claim 26, wherein the spacing member group is a hollow plate, the cooling substance flow channel is defined by a hollow structure of the hollow plate, and the exhaust flow channel is defined by the two adjacent hollow plates.

31. The system according to claim 30, wherein the two adjacent hollow plates are oppositely charged.

32. The system according to claim 31, wherein the distance between the two adjacent hollow plates is 100~400 mm.

33. The system according to claim 30, wherein an electrostatic generating device is further arranged between the two adjacent hollow plates, and the hollow plate is positively charged.

34. The system according to claim 33, wherein the distance between the two adjacent hollow plates is 50~300 mm.

35. The system according to claim 30, wherein the shape of the hollow plate is corrugate.

36. The system according to claim 35, wherein the shape of the hollow plate is sinusoidal.

37. The system according to claim 35, wherein the hollow plate is provided with one or more hook portions thereon.

38. The system according to claim 25, wherein the number of the spacing members is a plurality, the spacing member is tubular, and the exhaust flow channel is defined by an inner wall of the spacing member.

39. The system according to claim 38, wherein the spacing member is sheathed with a second tubular member outside, and the cooling substance flow channel is defined by an outer wall of the spacing member and an inner wall of the second tubular member.

40. The system according to claim 39, wherein the spacing member and the second tubular member are integrated.

41. The system according to claim 39, wherein the device further comprises a connecting piece for connecting the spacing member and the second tubular member.

42. The system according to claim 39, wherein the cross section of the spacing member is triangular, polygonal, circular or ellipse, and the cross section of the second tubular member is triangular, polygonal, circular or ellipse.

43. The system according to claim 42, wherein and the cross section of the spacing member is hexagonal, and the cross section of the second tubular member is hexagonal.

44. The system according to claim 38, wherein the device further comprises an electrostatic generating device located in the spacing member, and the spacing member is positively charged.

45. The system according to claim 25, wherein the cooling substance is a cooling liquid or cooling gas.

46. The system according to claim 45, wherein the cooling liquid is water.

47. The system according to claim 45, wherein the cooling liquid is industrial cooling water.

48. The system for removing dust and mist according to claim 25, wherein the temperature of the cooling substance is 3-20° C.

49. A thermal power plant exhaust purification method, comprising the following steps:
   providing an exhaust contact surface, such that the exhaust flows through the exhaust contact surface and the exhaust contact surface collects dust and/or mist contained in the exhaust;
   cooling the exhaust contact surface to form a water film on the exhaust contact surface;
   rinsing the dust and/or mist collected on the exhaust contact surface.

50. The method according to claim 49, wherein the method further comprises:
   providing flowing cooling substance;
   providing spacing members to provide the exhaust contact surface, and
   spacing the cooling substance and the exhaust.

51. The method according to claim 49, wherein the cooling substance is industrial cooling water.

* * * * *